(12) United States Patent
Tangudu et al.

(10) Patent No.: US 11,035,406 B2
(45) Date of Patent: Jun. 15, 2021

(54) MAGNETIC RADIAL BEARING WITH FLUX BOOST

(71) Applicant: Carrier Corporation, Palm Beach Gardens, FL (US)

(72) Inventors: Jagadeesh Kumar Tangudu, South Windsor, CT (US); Parag M. Kshirsagar, South Windsor, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 79 days.

(21) Appl. No.: 16/491,829

(22) PCT Filed: Feb. 23, 2018

(86) PCT No.: PCT/US2018/019538
§ 371 (c)(1),
(2) Date: Sep. 6, 2019

(87) PCT Pub. No.: WO2018/182891
PCT Pub. Date: Oct. 4, 2018

(65) Prior Publication Data
US 2021/0003171 A1    Jan. 7, 2021

Related U.S. Application Data (60) Provisional application No. 62/480,409, filed on Apr. 1, 2017.

(51) Int. Cl.
*F16C 32/04* (2006.01)
*H02K 7/09* (2006.01)
*H02K 5/16* (2006.01)

(52) U.S. Cl.
CPC ........ *F16C 32/0463* (2013.01); *F16C 32/048* (2013.01); *F16C 32/0451* (2013.01); *H02K 5/16* (2013.01); *H02K 7/09* (2013.01)

(58) Field of Classification Search
CPC .............. F16C 32/0468; F16C 32/0465; F16C 2360/00; F16C 32/0431; F16C 32/0436;
(Continued)

(56) References Cited

U.S. PATENT DOCUMENTS

| 3,958,842 A | 5/1976 | Telle |
| 4,037,886 A | 7/1977 | Boden et al. |

(Continued)

FOREIGN PATENT DOCUMENTS

| CN | 201307809 Y | 9/2009 |
| CN | 201696492 U | 1/2011 |

(Continued)

OTHER PUBLICATIONS

Office action dated Sep. 3, 2020 for Chinese Patent Application No. 201880022892.1.
(Continued)

*Primary Examiner* — Ahmed Elnakib
(74) *Attorney, Agent, or Firm* — Bachman & LaPointe, P.C.

(57) ABSTRACT

A magnetic bearing (20) has: a rotor (22) to be supported for rotation about an axis (502); and a stator (24) extending from a first end (30) to a second end (32). The stator has: a circumferential outer winding (50); a circumferential inner winding (52); a radial spacing (54) between the inner winding and the outer winding; a plurality of laminate teeth (84A, 84B, 86A, 86B); and a plurality of radial windings (34A, 34B, 36A, 36B) respectively encircling a respective associated tooth of the plurality of teeth. A plurality of magnetic flux paths are respectively associated with the plurality of radial windings and pass: radially through the associated winding; axially through the radial spacing; radially from the radial spacing to the rotor; and axially along the rotor.

20 Claims, 7 Drawing Sheets

(58) Field of Classification Search
CPC ............... F16C 32/0438; F16C 32/044; F16C 32/0459; F16C 32/0461; F16C 32/0474; F16C 32/0476; F16C 32/0478; F16C 32/0489; F16C 32/0491; F16C 32/0493; F16C 32/0495; F16C 32/0497; F16C 23/043; F16C 23/045; F16C 32/0406; F16C 32/0408; F16C 32/041; F16C 32/0412; F16C 32/0419; F16C 32/0421; F16C 32/0423; F16C 32/0429; H02K 5/16; H02K 7/09
USPC .......................................................... 310/90.5
See application file for complete search history.

(56) References Cited

U.S. PATENT DOCUMENTS

| | | | |
|---|---|---|---|
| 4,196,946 | A | 4/1980 | Lipscomb |
| 4,285,552 | A | 8/1981 | Sutter |
| 4,447,793 | A | 5/1984 | Gray |
| 4,542,311 | A | 9/1985 | Newman et al. |
| 4,634,191 | A | 1/1987 | Studer |
| 4,732,353 | A | 3/1988 | Studer |
| 4,891,567 | A | 1/1990 | Fujitani et al. |
| 5,095,237 | A | 3/1992 | Bardas et al. |
| 5,111,102 | A * | 5/1992 | Meeks ............. F16C 32/0444 310/90.5 |
| 5,179,308 | A | 1/1993 | Malsky |
| 5,202,598 | A | 4/1993 | Katsumata |
| 5,216,308 | A | 6/1993 | Meeks |
| 5,220,232 | A | 6/1993 | Rigney, II et al. |
| 5,231,336 | A | 7/1993 | van Namen |
| 5,319,273 | A | 6/1994 | Hockney et al. |
| 5,514,924 | A | 5/1996 | McMullen et al. |
| 5,572,079 | A | 11/1996 | Pinkerton |
| 5,736,800 | A | 4/1998 | Iannello et al. |
| 5,767,597 | A | 6/1998 | Gondhalekar |
| 6,121,704 | A | 9/2000 | Fukuyama et al. |
| 6,130,494 | A | 10/2000 | Schöb |
| 6,278,251 | B1 | 8/2001 | Schöb |
| 6,351,048 | B1 | 2/2002 | Schob et al. |
| 6,359,357 | B1 | 3/2002 | Blumenstock |
| 6,727,617 | B2 | 4/2004 | McMullen et al. |
| 6,777,841 | B2 | 8/2004 | Steinmeyer |
| 6,846,168 | B2 | 1/2005 | Davis et al. |
| 6,849,960 | B2 | 2/2005 | Hartman et al. |
| 7,126,244 | B2 | 10/2006 | Rozmus |
| 7,598,646 | B2 | 10/2009 | Cleveland |
| 7,786,638 | B2 | 8/2010 | Pulnikov et al. |
| 7,859,144 | B1 | 12/2010 | Sahyoun |
| 7,868,510 | B2 | 1/2011 | Rittenhouse |
| 8,169,118 | B2 | 5/2012 | Filatov |
| 8,400,038 | B2 | 3/2013 | Smith et al. |
| 8,847,451 | B2 | 9/2014 | Filatov et al. |
| 2001/0013733 | A1* | 8/2001 | Schob ............. F16C 32/0487 310/90.5 |
| 2003/0042812 | A1 | 3/2003 | Post |
| 2003/0042816 | A1 | 3/2003 | Post |
| 2003/0192449 | A1 | 10/2003 | Fiske et al. |
| 2004/0022653 | A1 | 2/2004 | Brunet et al. |
| 2004/0135450 | A1 | 7/2004 | Kanebako |
| 2008/0042504 | A1 | 2/2008 | Thibodeau et al. |
| 2009/0126519 | A1 | 5/2009 | Chassoulier |
| 2010/0013332 | A1 | 1/2010 | Vollmer |
| 2010/0013340 | A1 | 1/2010 | Brown |
| 2010/0090556 | A1 | 4/2010 | Filatov |
| 2010/0231076 | A1 | 9/2010 | Chiba et al. |
| 2011/0101905 | A1 | 5/2011 | Filatov |
| 2011/0163622 | A1 | 7/2011 | Filatov et al. |
| 2012/0139375 | A1 | 6/2012 | Masuzawa et al. |
| 2012/0299422 | A1 | 11/2012 | Filatov |
| 2012/0306305 | A1 | 12/2012 | Filatov |
| 2013/0062984 | A1 | 3/2013 | Tremelling |
| 2013/0216351 | A1 | 8/2013 | Griffin |
| 2015/0137642 | A1 | 5/2015 | Vande Sande |
| 2015/0330444 | A1 | 11/2015 | Wang |
| 2017/0007973 | A1 | 1/2017 | Schöb et al. |

FOREIGN PATENT DOCUMENTS

| | | |
|---|---|---|
| CN | 101979888 A | 2/2011 |
| CN | 201730962 U | 2/2011 |
| CN | 102042327 A | 5/2011 |
| CN | 102305242 B | 3/2013 |
| CN | 103427538 A | 12/2013 |
| CN | 103470630 A | 12/2013 |
| CN | 103671522 A | 3/2014 |
| CN | 103758766 A | 4/2014 |
| CN | 203743206 U | 7/2014 |
| CN | 203962688 U | 11/2014 |
| CN | 104632890 A | 5/2015 |
| DE | 102006062420 A1 | 12/2007 |
| DE | 102008021587 B3 | 12/2009 |
| EP | 0071456 A1 | 2/1983 |
| EP | 0724086 A1 | 7/1996 |
| EP | 0839291 B1 | 5/1998 |
| EP | 2060811 A1 | 5/2009 |
| EP | 2886891 A1 | 6/2015 |
| EP | 3115103 A1 | 1/2017 |
| FR | 2759434 A1 | 8/1998 |
| FR | 2954961 A1 | 7/2011 |
| JP | 57116933 A | 7/1982 |
| JP | 58184319 A | 10/1983 |
| JP | 11101233 A | 4/1999 |
| JP | 2001041239 A | 2/2001 |
| JP | 2001224154 A | 8/2001 |
| JP | 2001248639 A | 9/2001 |
| JP | 2002161918 A | 6/2002 |
| JP | 2010121713 A | 6/2010 |
| JP | 2011085223 A | 4/2011 |
| JP | 2013231471 A | 11/2013 |
| WO | 97/00639 A2 | 1/1997 |
| WO | 2007/049084 A1 | 5/2007 |
| WO | 2011/007544 A1 | 1/2011 |
| WO | 2014/007851 A1 | 1/2014 |
| WO | 2016/137775 * | 9/2016 |
| WO | 2016/137775 A1 | 9/2016 |
| WO | 2018/182872 A1 | 10/2018 |
| WO | 2018/182905 A1 | 10/2018 |

OTHER PUBLICATIONS

Jun Wang et al., "Intelligent Control in Current Digital Switching Power Amplifier for Active Magnetic Bearing", Jun. 1, 2015, pp. 31-39, Metallurgical and Mining Industry, Ukraine.
David C. Meeker et al., "Analysis and Control of a Three Pole Radial Magnetic Bearing", Tenth Int. Symp. Magnetic Bearings, Aug. 21, 2006, Martigny, Switzerland.
International Search Report and Written Opinion dated May 31, 2016 for PCT/US2016/017943.
Office Action dated Aug. 6, 2019 for U.S. Appl. No. 15/548,613.
International Search Report and Written Opinion dated May 15, 2018 for PCT/US2018/019538.
International Search Report and Written Opinion dated Jun. 11, 2018 for PCT/US2018/018624.
International Search Report and Written Opinion dated Jun. 7, 2018 for PCT/US2018/019903.
Chinese Office Action dated Jan. 25, 2019 for Chinese Patent Application No. 201680012346.0.
Chinese Office Action dated Mar. 31, 2020 for Chinese Patent Application No. 201680012346.0.

* cited by examiner

MAGNETIC RADIAL BEARING WITH FLUX BOOST

CROSS-REFERENCE TO RELATED APPLICATION

Benefit is claimed of U.S. Patent Application No. 62/480,409, filed Apr. 1, 2017, and entitled "Magnetic Radial Bearing with Flux Boost", the disclosure of which is incorporated by reference herein in its entirety as if set forth at length.

BACKGROUND

The disclosure relates to magnetic bearings. More particularly, the disclosure relates to electromagnetic bearings utilized in turbomachines.

A well-developed art exists in active magnetic bearings. US Patent Application Publication 2011/0163622A1 (US '622), published Jul. 7, 2011, discloses an electromagnetic bearing providing radial and axial support. For axial support, the stator has a pair of opposite axial poles joined at an outer diameter (OD) by an axial back iron. An axial coil circumferentially wraps inboard of the back iron and creates a flux path through the axial poles and back iron with an inboard gap between the axial poles spanned by an actuator target formed by a rotor lamination stack within the gap.

Generally, radially inboard of the axial coil, the US '622 stator comprises a radial actuator pole assembly formed by a lamination stack. This lamination stack has a full annulus outer ring portion and a plurality of radially-inward projections each of which is wrapped by an associated radial control coil. Adjacent the radial actuator pole assembly at opposite axial ends thereof, sandwiched between the radial actuator pole assembly and the axial poles, are a pair of permanent magnetic rings.

Generally, a pair of radial flux loops are created at opposite sides proceeding radially from the US '622 actuator target through the radial pole assembly, turning axially outboard through the permanent magnet and then radially inboard through the associated axial pole, turning back axially inward to enter the end of the actuator target and then turning back radially outward. Thus, a pair of radial fluxes of opposite sign are encircled by the axial flux loop.

Another four-radial-pole radial bearing configuration involves flux paths that pass radially and circumferentially rather than axially. In this configuration, switching can be between several conditions. One group involves flux paths with a central diametric leg through one opposed pair of poles and two circumferential legs passing circumferentially through the back iron around the respective poles of the other pair. The two pairs thus create two possible such paths with two possible directions for each path. Additionally another group involves a first flux path leg passing radially through one pole, turning circumferentially to pass through the back iron to one of the two adjacent poles and then returning back radially through that adjacent pole to meet the first leg in the shaft.

PCT/US2016/017943, filed Feb. 15, 2016 and entitled "Magnetic Bearing" and published Sep. 1, 2016 as WO/2016/137775 (the WO '775 publication), the disclosure of which is incorporated by reference herein in its entirety as if set forth at length, discloses a magnetic radial/thrust bearing utilizing permanent magnet bias and electromagnet bias.

U.S. Patent Application No. 62/381,746, filed Aug. 31, 2016, and entitled "Magnetic Thrust Bearing", the disclosure of which is incorporated by reference herein in its entirety as if set forth at length, discloses a magnetic thrust bearing combining permanent magnet bias and electromagnet bias.

SUMMARY

One aspect of the disclosure involves a magnetic bearing comprising: a rotor to be supported for rotation about an axis; and a stator extending from a first end to a second end. The stator comprises: a circumferential outer winding; a circumferential inner winding; a radial spacing between the inner winding and outer winding; a plurality of laminate teeth; and a plurality of radial windings respectively encircling a respective associated tooth of the plurality of teeth. A plurality of magnetic flux paths are respectively associated with the plurality of radial windings and pass: radially through the associated winding; axially through the radial spacing; radially from the radial spacing to the rotor; and axially along the rotor.

A further embodiment may additionally and/or alternatively include a metallic core between the inner winding and the outer winding.

A further embodiment may additionally and/or alternatively include one or more additional laminates, the inner winding axially between the additional laminates and the plurality of laminate teeth.

A further embodiment may additionally and/or alternatively include the inner winding and outer winding are connected in series to pass current in opposite circumferential directions.

A further embodiment may additionally and/or alternatively include the bearing has no permanent magnets.

A further embodiment may additionally and/or alternatively include the magnetic bearing being a non-thrust bearing.

A further embodiment may additionally and/or alternatively include a DC power supply connected to the inner winding and outer winding.

A further embodiment may additionally and/or alternatively include a plurality of H-bridge amplifiers coupled to the plurality of radial windings.

A further embodiment may additionally and/or alternatively include a method for using the magnetic bearing. The method comprises running current through: the plurality of radial windings, so as to control radial position of the rotor.

A further embodiment may additionally and/or alternatively include the plurality of radial windings comprising a diametrically opposite first pair of windings and a diametrically opposite second pair of windings orthogonal to the first pair of windings.

A further embodiment may additionally and/or alternatively include the first and second pairs of windings each being powered by a respective associated H-bridge amplifier.

A further embodiment may additionally and/or alternatively include running current through the inner winding and the outer winding to produce a magnetic flux.

A further embodiment may additionally and/or alternatively include the running current through the inner winding and the outer winding comprising running a single said current in opposite circumferential directions.

A further embodiment may additionally and/or alternatively include the running current comprising running current through one winding of the first pair of windings to augment the magnetic flux while running current through the other winding of the first pair of windings to counter the magnetic flux.

A further embodiment may additionally and/or alternatively include a machine comprising the bearing.

Another aspect of the disclosure involves a method for operating a magnetic bearing, the magnetic bearing comprising: a rotor to be supported for rotation about an axis; and a stator extending from a first end to a second end. The stator comprises: a circumferential outer winding; a circumferential inner winding; a radial spacing between the inner winding and outer winding; and a plurality of radial windings. The method comprises running current in opposite circumferential directions through the inner winding and the outer winding to produce a magnetic flux.

Another aspect of the disclosure involves a method for providing magnetic flux in a radial magnetic bearing, the radial magnetic bearing comprising: a rotor to be supported for rotation about an axis; and a stator extending from a first end to a second end. The stator comprises a circumferential winding and a plurality of radial windings. The method comprises: running current through the circumferential winding to produce a magnetic flux.

A further embodiment may additionally and/or alternatively include running current through the plurality of radial windings so as to circumferentially differentially affect the magnetic flux.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
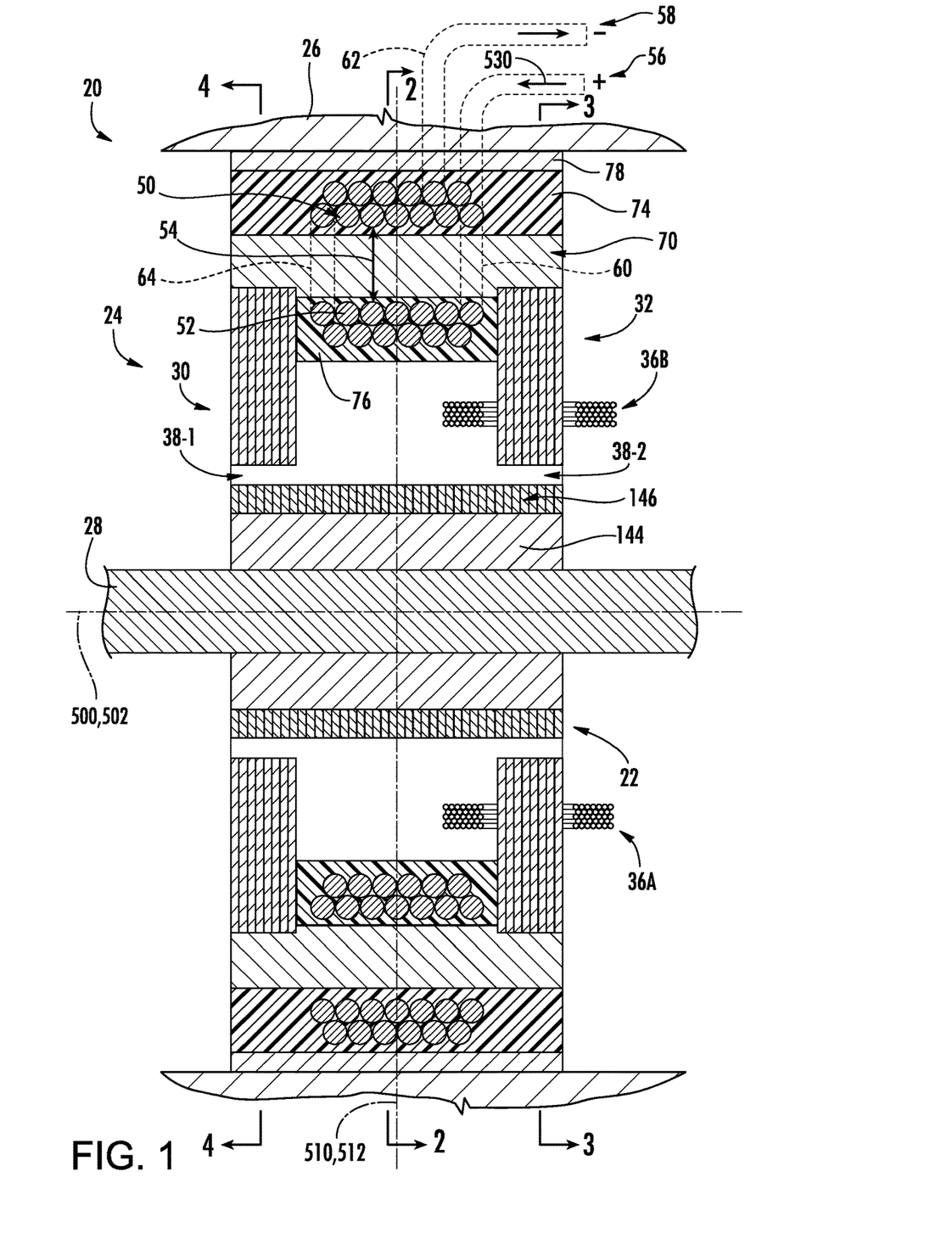
FIG. 1 is a partial, partially schematic, central longitudinal axial sectional view of an electromagnetic bearing in a compressor.

FIG. 1 shows an axial homopolar bearing 20 having a rotor 22 and a stator 24. The stator has a central longitudinal axis 500. The rotor has a central longitudinal axis 502. The axes 500 and 502 are nominally normally coincident; however, the bearing may absorb slight excursions of the rotor axis relative to the stator axis. The magnetic bearing may be used in a turbomachine (e.g., a compressor) wherein the stator is mounted to or otherwise integrated with) a housing or case of the compressor and the rotor is mounted to (or otherwise integrated with) a shaft of the compressor. A stator transverse centerplane is shown as 510 and the normally coincident rotor transverse centerplane is shown as 512. For purposes of schematic illustration, the housing or case is shown as 26 and the shaft is shown as 28. Exemplary compressors are centrifugal compressors.

The bearing extends from a first end 30 to a second end 32. The stator includes a number of coils (e.g., metallic wire windings). As is discussed further below, the exemplary bearing is a purely radial bearing and not an axial or thrust bearing. Alternative implementations may integrate with axial bearing features. Also, the exemplary embodiment is mechanically a symmetric end-to-end about the centerplane 510, 512. As is discussed further below, there may be more complex versions that could be grossly mechanically symmetric and may also be grossly electrically symmetric (e.g., the overall layout of the coils is symmetric) but the wrapping of the coils and the electrical connections may be asymmetric in order to provide the control described.

Figure 2:
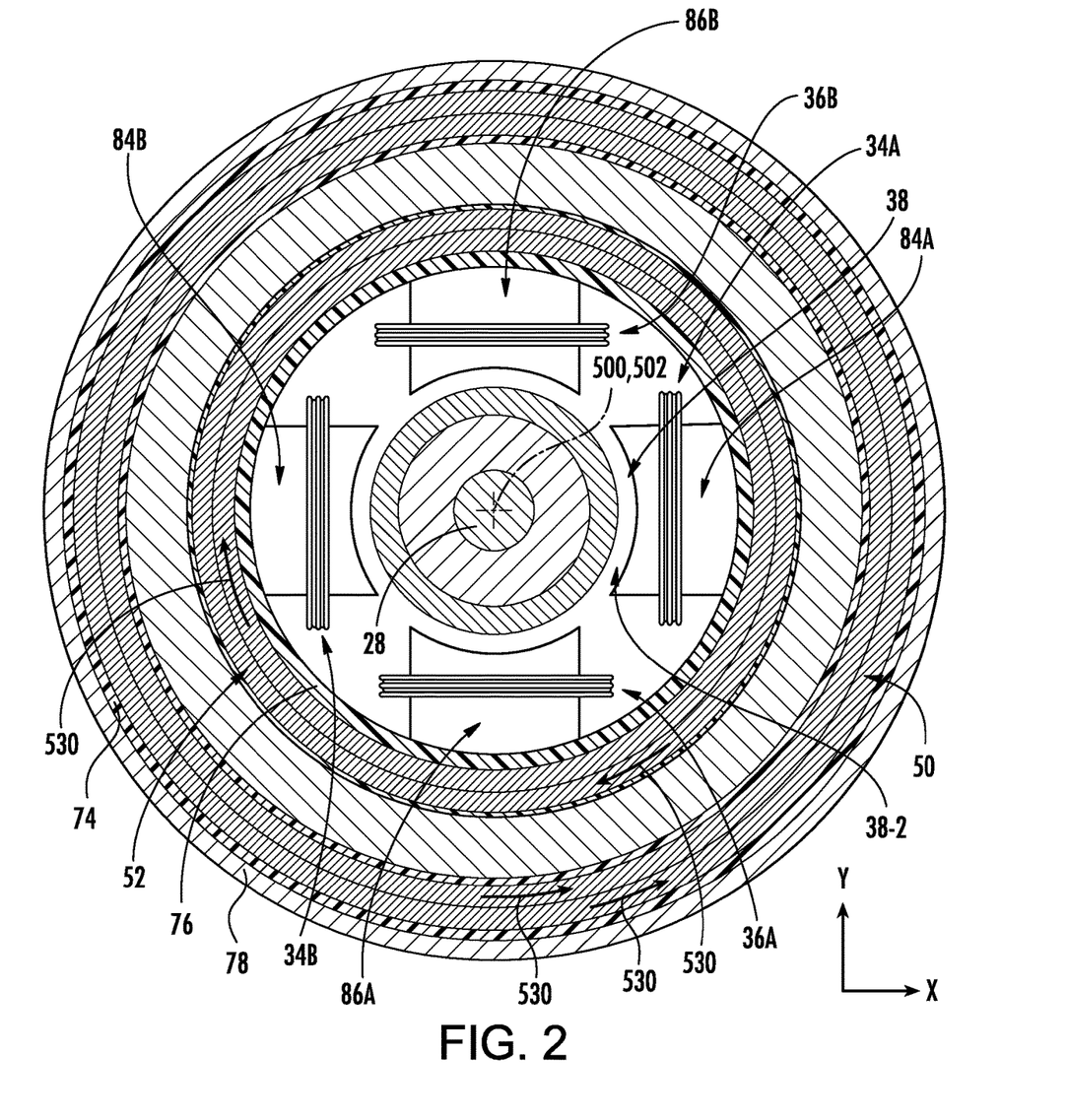
FIG. 2 is a transverse sectional view of the bearing taken along line 2-2 of FIG. 1.
Figure 3:
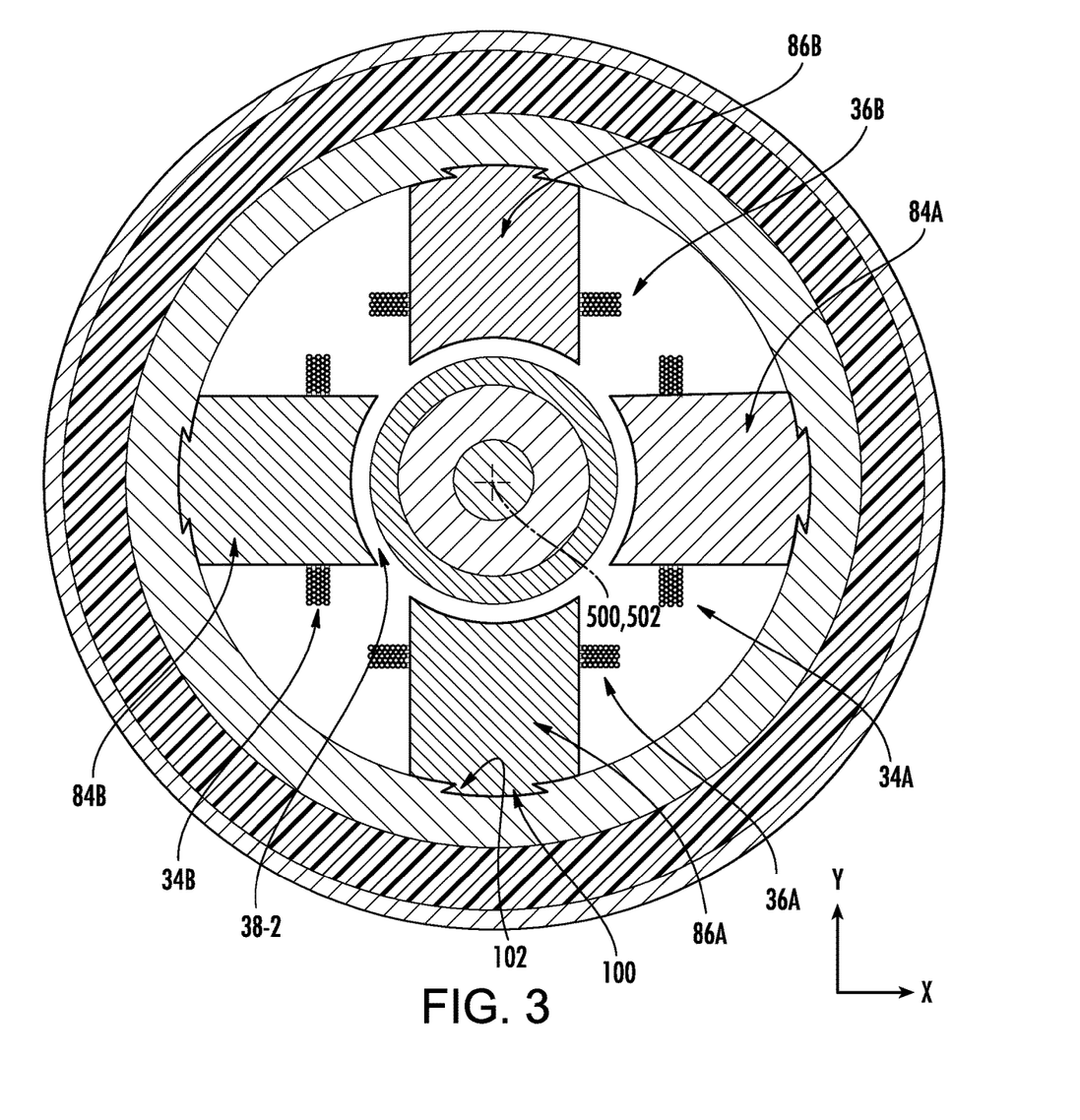
FIG. 3 is a transverse sectional view of the bearing taken along line 3-3 of FIG. 1.

In the exemplary radial bearing, there are four radial coils: two orthogonal pairs of two diametrically opposed coils. In the X-Y frame of reference shown in FIG. 2, there is a pair of X coils 34A, 34B and a pair of Y coils 36A, 36B. FIG. 2 further shows a local radial gap 38 between rotor and stator. As is discussed further below, in operation magnetic flux crosses the gap 38 at various locations to exert a net force on the rotor. Energizing the X coils in one way exerts a force in the positive X direction and energizing X coils in the opposite way exerts a force in the negative X direction. Similarly, energizing the Y coils in one way exerts a net force in the positive Y direction and energizing the Y coils in the opposite way exerts a force in the negative Y direction. Control may be responsive to conventional radial position sensors (not shown) integrated with or otherwise associated with the bearing. The exemplary coils in a given pair may be electrically connected in series or controlled separately so that currents through them create a radial control field that either opposes or assists a DC bias field (discussed below).

The stator comprises a circumferential outer winding 50 (FIG. 1) and a circumferential inner winding 52 coaxially radially spaced apart from each other by a radial spacing 54. As is discussed further below, the windings 50 and 52 may be configured to pass currents in opposite circumferential directions from each other such as by the direction of wrapping. In the illustrated example, the windings are electrically in series and may be formed by a single wire or bundle of wires extending between terminals 56 and 58. In the exemplary configuration, a section 60 of wire extends between the inner winding 52 and the terminal 56 and a section 62 of wire extends between the outer winding and the terminal 58. A segment 64 of wire radially spans the gap/spacing 54 to connect the two windings 50 and 52 in series. Thus, when a current 320 is applied between the terminals 56 and 58, it will pass in one circumferential direction in one of the windings and in the opposite circumferential direction in the other of the windings. As is discussed below, this may be used to provide a baseline bias. In the exemplary embodiment, the inner winding is radially inboard of a metallic core 70 (e.g., soft magnetic steel) and the outer winding is radially outboard thereof. The respective windings may be encapsulated in encapsulant 74, 76 such as a molded polymer, optionally fiber-reinforced. A metallic sleeve or jacket 78 may circumscribe the encapsulant 74 to ease mounting to the turbomachine housing 26 (e.g., via press fit, keyed interfitting, or the like).

The exemplary ring 70 is formed as a continuous full annulus single piece rather than segmented. The ring 70 has an ID face and an OD face and opposite axial end faces. Extending radially inward from the ID face are a plurality of laminate teeth (FIG. 2) 84A, 84B, 86A, 86B respectively associated with and encircled by the coils 34A, 34B, 36A, 36B. Exemplary laminates (and other laminates discussed below) are axial stacks of steel plates (e.g., soft magnetic steel or silicon steel). Use of laminate reduces eddy loss relative to a single block of steel. The laminate within the coils functions as a core.

Figure 4:
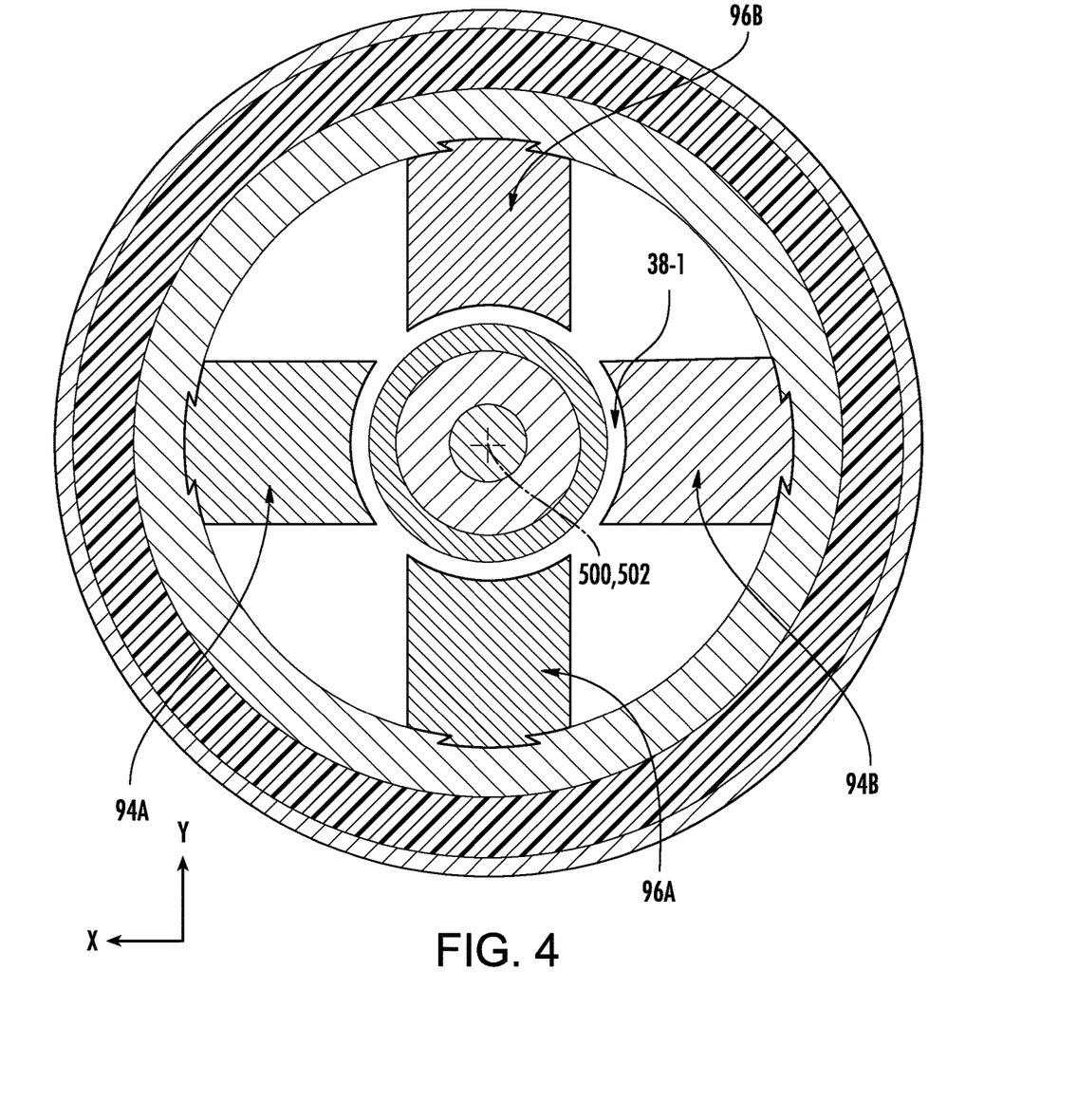
FIG. 4 is a transverse sectional view of the bearing taken along line 4-4 of FIG. 1.

The exemplary teeth have ID and OD faces, opposite axial end faces, and opposite circumferential end faces. The ID faces fall along a central portion 38-2 of the gap 38. The OD portions may bear attachment features for mounting to the ring 70. An exemplary attachment feature 100 is a dovetail projection on the OD face of the tooth mating with a dovetail groove or channel 102 in the ID surface of the ring. In combination, the teeth 84A, 84B, 86A, 86B may be designated as a second end laminate. In some implementations, there may be a single second end laminate such that, for example, an outer diameter portion is full annulus and the teeth extend radially inward therefrom. Such an assembly could be mounted in the ring 70 by shrink fit (e.g., heating the ring, sliding the laminate in and then cooling the ring). FIG. 4 shows first end laminate teeth 94A, 94B, 96A, 96B which may similarly form a first end laminate. The first end laminate teeth may also bear radial coils. However, in this exemplary embodiment, there are no coils/windings encircling these teeth. Accordingly, a possible further variation would be to have essentially a full annulus structure without individual teeth.

Returning to FIG. 1, the exemplary rotor 22 comprises a metallic core 144 carrying a laminate 146 on its outer diameter (OD) surface. The exemplary laminate 146 is full-length for ease of manufacture. Portions of the laminate axially between the teeth may be essentially non-functional and could be replaced by monolithic steel or other filler material.

Figure 5:
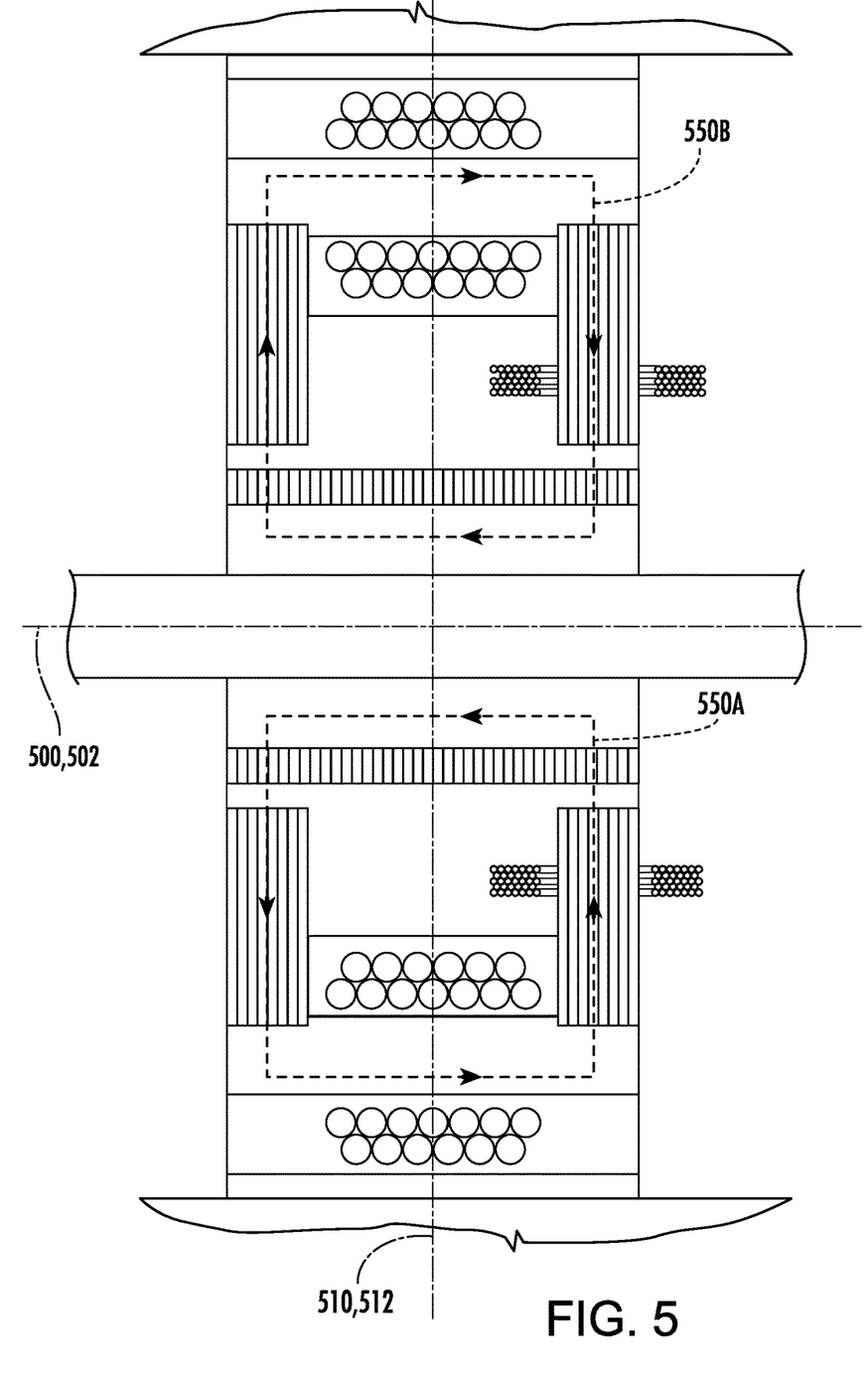
FIG. 5 is a schematic central longitudinal sectional median magnetic flux diagram showing permanent magnet flux.

FIG. 5 shows a schematic longitudinal sectional view centrally through diametrically opposed pair of the second end teeth and coils of the bearing 20. In section, two flux loops 550A, 550B are shown. These are shown schematically with a single line each rather than a plurality of lines each as in a contour map. Also, though one broken line path is shown through each laminate stack, it would be a distribution of flux across the laminate stack. In FIG. 5, the radial coils are not energized but the circumferential windings are. Thus, fields in the upper half of the drawing are symmetric to those in the lower half. In the exemplary embodiment, the DC electric current 530 (FIG. 2) runs out of the plane of the drawing in the upper half of the FIG. 7 sheet for the inner winding and into the plane of the drawing in the upper half of the sheet for the outer winding.

Figure 6:
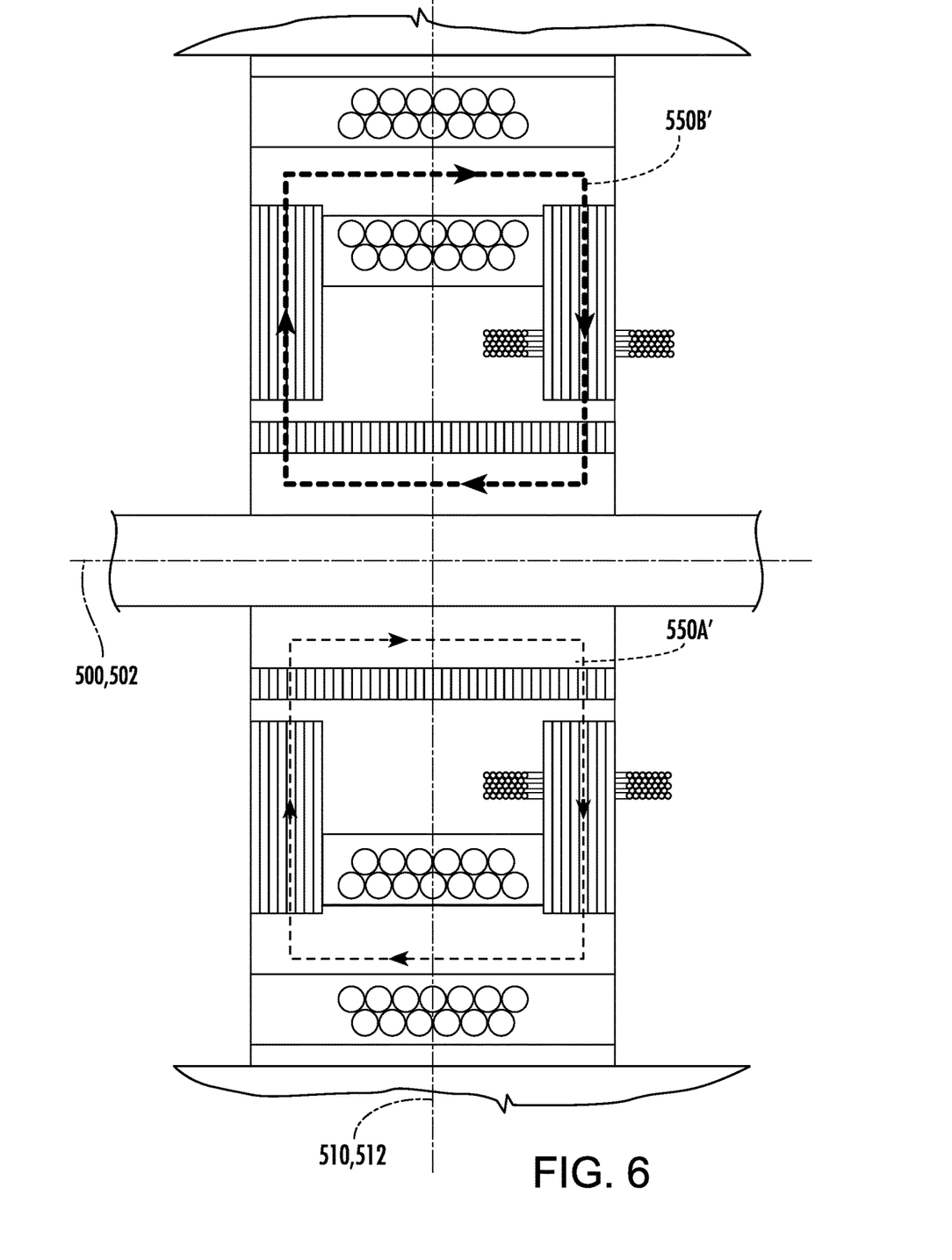
FIG. 6 is a schematic central longitudinal sectional median magnetic flux diagram showing combined permanent magnet and electro-magnet flux.

FIG. 6 shows the fields as modified by electromagnetic bias of the radial coils to exert an upward force on the rotor as viewed in FIG. 6. Specifically, the illustrated coils are energized in such a direction so that their associated magnetic flux augments the loops in the upper half of the sheet and counters the loops in the lower half. The exemplary magnitudes of applied currents are significant enough so that the net flux 550A' in the lower half is reversed in direction relative to that of FIG. 5. Thus the upper flux loop 550B', is schematically shown of increased flux by greater line weight than in FIG. 5. The net effect of this is to apply a force to the rotor in the upward direction along the sheet.

Figure 7:
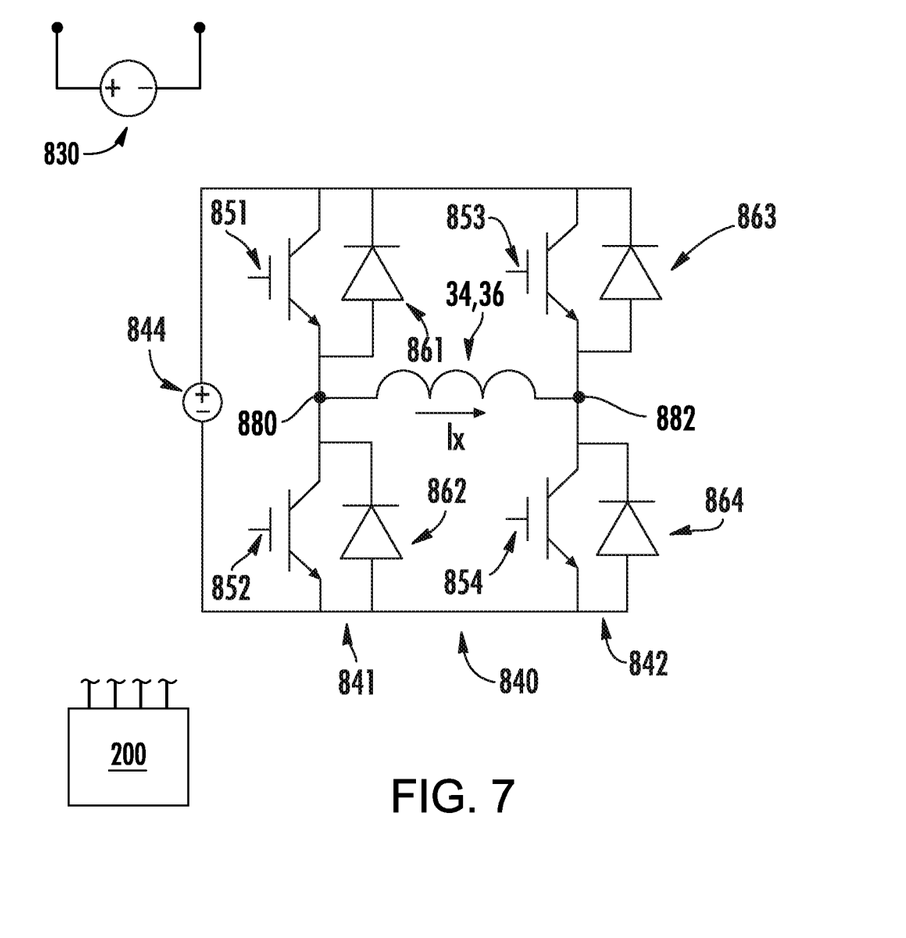
FIG. 7 is a schematic view of an H-bridge amplifier used to power one or more coils.

Electrical hardware may comprise a traditional H-bridge for control of current in the coils 34A, 34B, 36A, 36B such as is disclosed in the WO '775 publication. FIG. 7 shows DC supply 830 for powering the circumferential windings and one of several H-bridge amplifiers 840 used to power one or more radial coils. These may be controlled by or integrated with the controller 200. In one example, a single constant DC current is run through the inner and outer windings by the DC supply 830.

An alternative to direct connection of the DC supply involves a DC-DC converter to be able to control the magnitude of the current.

In one example, each H-bridge amplifier 840 has a single associated coil and vice-versa. This allows independent powering of the coils so that different current magnitudes may be applied to each. The amplifier 840 has two legs or branches 841 and 842 connected in parallel to a voltage source 844. The exemplary voltage source 844 is a constant DC voltage source and may be shared by the H-bridge amplifiers of the different coils.

The terminals 880 and 882 of the coil are connected across central locations of the two legs 841 and 842. To each side (high voltage and low voltage) of each leg, the terminal 880, 882 is connected to the voltage source via the parallel combination of a respective switching device 851, 852, 853, 854 and diode 861, 862, 863, 864. Exemplary switching devices are gate controlled switching devices such as insulated gate bipolar transistors (IGBT) or metal oxide field effect transistors (MOSFET). As noted above, 880 and 882 may represent terminals of an individual coil. Alternatively, the coils in a given pair may be in series powered by a single H-bridge amplifier so that the terminal 880 is one terminal of the first coil, the terminal 882 is one terminal of the second coil, and the other terminals of the coils are connected to each other.

Alternative embodiments may have asymmetries between the coils of the two respective pairs or the two coils of a given pair. For example, it may be desirable to provide a baseline upward bias. Also, yet alternative embodiments may have configurations other than the two pairs (e.g., three coils and associated teeth at 120° intervals. Similarly, the exemplary embodiment has the same number of turns for the inner winding and outer winding. However, other embodiments may have asymmetries with more turns in one than the other.

FIG. 7 further shows a controller 200. The controller may be integrated with or provided by a controller of the turbomachine (e.g. electric compressor) as a whole or the system (e.g., refrigeration system). The controller may receive user inputs from an input device (e.g., switches, keyboard, or the like) and sensors (not shown, e.g., pressure sensors and temperature sensors at various system locations and, specifically for bearing control, radial position sensors (e.g., as shown in the WO '775 publication) and axial position sensors. The controller may be coupled to the sensors and controllable system components (e.g., valves, the bearings, the compressor motor, vane actuators, and the like) via control lines (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components. Exemplary control is as disclosed in the WO '775 publication.

As is discussed above, there may be various further modifications to the stator and/or rotor. One area for modifications involves the arrangement of the inner and outer windings. For example, in axial cross-section, other layouts of the windings may be used. For more efficient and gradual turning of the flux, the ring 70 could be of arcuate central longitudinal section (e.g., convex outward and concave inward with the individual turns of the windings following that shape). However, such a configuration may tend to radially expand the bearing and be inefficient from a packaging point of view. Other modifications may compromise electric/magnetic efficiency for packaging efficiency. Examples of such a system might include reversing the concavity and convexity so that a central portion of the ring 70 is radially inwardly recessed relative to axial end portions.

A variety of other variations may be made on the rotor. For example, U.S. Patent Application No. 62/480,405, filed Apr. 1, 2017, the disclosure of which is incorporated by reference in its entirety herein as if set forth at length, discloses several examples of rotors bearing permanent magnets. Accordingly, similar rotor magnets may be used to boost the baseline DC-induced flux of FIG. 5. Similarly a permanent magnet boost may be provided on the stator such as by locating an axially polarized permanent magnetic ring within the radial spacing between inner and outer coils (e.g., occupying a circumferential channel in the ring 70).

Contrasted with different alternative prior art bearings, various implementations may have one or more of several advantages. The DC windings and any added magnets provide an additional flux boost. For example, in various embodiments this boost may allow use of non-rare earth magnets or, as illustrated in FIG. 1, avoidance of all permanent magnets. In particular, avoidance of rare earth magnets limits cost. This reduces costs. Rare earth magnets are characterized by magnets with use rare earth elements such as dysprosium, terbium, europium, neodymium, samarium, and yttrium. Combined contents of those elements will typically be at least 10.0% by weight (e.g. 10.0% to 50.0%) or at least 20.0%. Neodymium is typically the key element in the main class of rare earth magnets (neodymium magnets), thus non-rare earth magnets may have under 10.0% by weight of this element in particular. Another class is samarium-cobalt magnets (e.g. typically 15% to 45% samarium by weight) Thus, in non-rare earth magnets, samarium may also be below 15.0% or 10.0% by weight. Exemplary non-rare earth magnets are ferrite/ceramic magnets, alnico, manganese bismuth, iron nitride, and the like. However, other embodiments may use rare earth magnets or combinations.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A magnetic bearing (20) comprising:
   a rotor (22) to be supported for rotation about an axis (502); and
   a stator (24) extending from a first end (30) to a second end (32) and comprising:
     a circumferential outer winding (50);
     a circumferential inner winding (52), the inner winding and the outer winding each fully circumscribing the axis;
     a radial spacing (54) between the inner winding and the outer winding;
     a plurality of laminate teeth (84A, 84B, 86A, 86B); and
     a plurality of radial windings (34A, 34B, 36A, 36B) respectively encircling a respective associated tooth of the plurality of teeth; and
     a plurality of magnetic flux paths respectively associated with the plurality of radial windings and passing:
       radially through the associated winding;
       axially through the radial spacing;
       radially from the radial spacing to the rotor; and
       axially along the rotor.

2. The magnetic bearing of claim 1 further comprising a metallic core (70) between the inner winding and the outer winding.

3. The magnetic bearing of claim 1 further comprising one or more additional laminates (94A, 94B, 96A, 96B), the inner winding axially between the additional laminates and the plurality of laminate teeth.

4. The magnetic bearing of claim 1 wherein:
   the inner winding and outer winding are connected in series to pass current (530) in opposite circumferential directions.

5. The magnetic bearing of claim 1 wherein the bearing has no permanent magnets.

6. The magnetic bearing of claim 1 being a non-thrust bearing.

7. The magnetic bearing of claim 1 further comprising:
   a DC power supply (830) connected to the inner winding and outer winding.

8. The magnetic bearing of claim 7 further comprising:
   a plurality of H-bridge amplifiers (840) coupled to the plurality of radial windings.

9. A method for using the magnetic bearing of claim 1, the method comprising running current through:
   the plurality of radial windings,
   so as to:
   control radial position of the rotor.

10. The method of claim 9 wherein:
    the plurality of radial windings comprises a diametrically opposite first pair of windings and a diametrically opposite second pair of windings orthogonal to the first pair of windings.

11. The method of claim 10 wherein:
    the first and second pairs of windings are each powered by a respective associated H-bridge amplifier.

12. The method of claim 10 further comprising:
    running current (530) through the inner winding and the outer winding to produce a magnetic flux (550A, 550B).

13. The method of claim 12 wherein:
    the running current through the inner winding and the outer winding comprises running a single said current in opposite circumferential directions.

14. The method of claim 12 wherein:
    the running current comprises:
    running current through one winding of the first pair of windings to augment the magnetic flux while running current through the other winding of the first pair of windings to counter the magnetic flux.

15. A machine comprising a bearing according to claim 1.

16. The magnetic bearing of claim 1 wherein:
the inner winding and the outer winding each fully circumscribe the axis.

17. The magnetic bearing of claim 1 wherein:
the inner winding and the outer winding are electrically in series.

18. A method for operating a magnetic bearing (20), the magnetic bearing comprising:
- a rotor (22) to be supported for rotation about an axis (502); and
- a stator (24) extending from a first end (30) to a second end (32) and comprising:
  - a circumferential outer winding (50);
  - a circumferential inner winding (52), the inner winding and the outer winding each fully circumscribing the axis;
  - a radial spacing (54) between the inner winding and outer winding; and
  - a plurality of radial windings (34A, 34B, 36A, 36B), the method comprising:
running current (530) in opposite circumferential directions through the inner winding and the outer winding to produce a magnetic flux (550A, 550B).

19. The method of claim 18 wherein:
the inner winding is coaxial with the outer winding.

20. The method of claim 18 wherein:
the current runs in series through the inner winding and the outer winding.

* * * * *